United States Patent [19]

Walsh

[11] Patent Number: 5,238,693
[45] Date of Patent: Aug. 24, 1993

[54] METHOD FOR MAKING HARD PRETZELS

[75] Inventor: Leo P. Walsh, DeSoto, Mo.

[73] Assignee: Recot Inc., Dallas, Tex.

[21] Appl. No.: 954,401

[22] Filed: Sep. 29, 1992

Related U.S. Application Data

[63] Continuation-in-part of Ser. No. 845,396, Mar. 3, 1992, abandoned.

[51] Int. Cl.$^5$ ................................................ A23L 1/10
[52] U.S. Cl. .................................... 426/293; 426/296; 426/304; 426/466; 426/499; 426/523
[58] Field of Search .............. 426/293, 291, 296, 304, 426/305, 467, 808, 442, 509, 94, 499, 466; 425/311; 99/327

[56] References Cited

PUBLICATIONS

S. A. Matz, 1972, Bakery Technology and Engineering The AVI Publishing Company, Inc. Westport, Conn. pp. 218–220.
D. K. Tressler, et al. 1975 Food Products Formulary vol. 2 Cereals, Baked Goods, Dairy and Egg Products AVI Publishing Company, Inc. Westport, Conn. pp. 167 and 168.

Primary Examiner—Steven Weinstein
Assistant Examiner—Anthony Weier
Attorney, Agent, or Firm—Veo Peoples, Jr.; Tom Schur

[57] ABSTRACT

A continuous process for producing hard pretzels is disclosed in which the pretzel dough is passed through an initial bath of hot caustic solution to cook the dough and to essentially caramelize its surface; the cooked and caramelized dough is then transported through a spray zone where it is sprayed with atomized hot caustic solution; and the sprayed product is salted with flake-type salt prior to hard baking. The process substantially improves flake-type salt retention at the surface of the pretzel and permits the use of lower concentrations of caustic while surprisingly improving the characteristic taste, texture and appearance of hard pretzels.

7 Claims, No Drawings

METHOD FOR MAKING HARD PRETZELS

This is a continuation-in-part of copending application Ser. No. 07/845,396 filed on Mar. 3, 1992, now abandoned.

BACKGROUND OF THE INVENTION

1. Field of the Invention

The present invention relates to methods for the continuous production of pretzel products; particularly, the invention relates to methods for producing hard pretzels on a continuous basis salted with flake-type salt.

2. Background of the Prior Art

The making of pretzels is an art which has been practiced for many years. The art is replete with different types and classifications of pretzel processes including simple techniques to relatively sophisticated procedures. However, the effectiveness of even the most subtle differences and variations from one technique to another, as nearly as can be determined, hinges almost entirely upon whether the characteristic flavor of the hard pretzel or whether the bread-stick type flavor of the soft pretzel is desired. To the extent that such flavor and texture differences are quite perceptible, even though particular chemical and physical factors minimally required to produce all pretzels must remain the same, it is difficult to predict whether even minor process changes will lead to improvement in, for example, salt retention, without perceivable flavor or texture distortion.

Pretzels are baked products which are produced from essentially rather simple recipes containing flour, corn syrup, water, salt, and other ingredients. Generally, all pretzels have a characteristic flavor which is imparted by chemical reactions occurring during the final baking step and by flavoring ingredients, such as malt and yeast. However, there are perceptible differences. In the case of hard pretzels, an essential distinctive flavor difference is developed by fully precooking the pretzel dough prior to baking. This precooking step is marked by starch gelatinization which occurs at temperatures exceeding 150 degrees F. Traditionally, precooking is achieved by submerging the pretzel dough in sufficiently concentrated, hot caustic solution where the corn syrup constituent of the dough base formula reacts with the caustic, thereby converting sodium hydroxide to sodium carbonate, increasing the reducing sugars and changing the pH. Absent this precooking, the final pretzel will have a perceivably different, bread stick—type or cracker-like, flavor, which is desired for soft pretzels.

Furthermore, pretzels are especially characterized by the presence of a darkly browned exterior surface. This surface browning stems from any of several methods of treating pretzel dough with caustic solution. For hard pretzels the caustic must be hot enough and the dough exposed long enough to actually cook. For soft pretzels, the caustic can be at room temperature, provided that it is sufficiently concentrated to reactively increase the concentration of reducing sugars needed for browning the pretzel surface during the final baking step.

In the case of hard pretzels, which are precooked, the reducing sugars are concentrated at the surface of the pretzel in the form of a solid, hard-caramelized coating instantly formed as the pretzels are conveyed from the cooker. This caramelized coating is, in large part, responsible for the shinier, darker appearance of hard pretzels after baking. In the past, it has been essential that hard pretzels be cooked at no higher than 190 degrees F which would maintain this shine without cooking so hard as to inhibit salt retention.

On the other hand, soft pretzels are characterized by a more dull finish and a somewhat lighter brown color unless egg whites or other coloring aids are employed. In fact, soft pretzels and the so-called "filled" pretzels, which contain edible material such as cheese, have a discontinuous brown coating which reveals the light colored internals of the pretzels at their fold points. The caustic treatment for such pretzels have commonly included submerging or dipping into a bath of lower temperature caustic, or alternatively there have been techniques which call for transporting the soft pretzel dough through caustic spray zones.

Such a spray technique was disclosed in U.S. Pat. No. 3,935,807, where the step of submerging the pretzel dough in a caustic bath was replaced by a spray step in order to avoid delays in processing, inefficient use of caustic solution, and to avoid the pretzels floating off of racks, which are ordinarily found in soft pretzel making machines at the concessionaire stands of stadiums.

Also U.S. Pat. No. 4,759,939 discloses spraying hot caustic solution at 180 degrees F to 200 degrees F prior to baking "filled" pretzels in order to achieve browning "without submersion of the pretzel doughs," otherwise the dough would tend to over absorb moisture from the caustic bath, rendering the dough unduly soft and pliable and leading to loss of shape and difficulty in maintaining the shape profile needed for injection of edible filling materials. In producing either filled pretzels or soft pretzels, such spray techniques, whether hot or cold caustic, tend to allow the surface of the pretzel to remain sufficiently low in reducing sugars to maintain the desired lighter brown dough finish, and sufficiently uncooked to exude the characteristic bread stick or cracker-like flavor. Furthermore, the caustic is substantially less concentrated (0.3% by weight rather than 1.8% as is used for hard pretzels). The heretofore expected drawbacks to employing such spray techniques in the production of hard pretzels are the inability of even hot spray to cook the dough, the tendency to wash off surface caramelization even if the dough was precooked, and the tendency to distort the desired flavor or texture of hard pretzels.

The final step in the production of hard pretzels, prior to baking, is that of salting the surface of the pretzel. For hard pretzels, the type of salt commonly used is a crushed rock salt acquired from mining deposits. The rock salt is uniform and rectangular in shape having distinct pointed edges. These so-called "shape points" allow the rock salt to pierce the caramelized coating found at the surface of hard pretzels, and to remain adherent thereto in a uniform and quantitatively acceptable manner.

Recently, it has become desirable to replace rock pretzel salt with flake-type "processed salt". This salt, is processed from brine, and treated to remove the calcium and magnesium impurities which cannot be removed from rock salt. Substantial removal of these impurities provides a milder, less bitter taste and enables the salt to be more readily dissolved when ingested by humans. Unfortunately, the processed salt is in the form of flat, irregular flakes, having no "shape points."

This flake-type salt has been disclosed for the production of soft pretzels in Example 1 of U.S. Pat. No. 4,803,084 where the low-temperature caustic dip or submersion technique was employed. However, the dough surface was not caramelized.

When applying such flake-type salt to a caramelized surface as is required during hard pretzel processing, prior to baking, there is a substantial quantitative variance in salt adherence and substantial waste. In order to achieve the desired 3% salt by weight of the pretzels in the bag, it was heretofore necessary to apply 17% salt by weight of the pretzels during the salt application stage. This causes such a tremendous handling and maintenance problem that flake-type salt has rarely been used on hard pretzels. Attempts to condition the surface during hard pretzel production as, for example, by a softer cook and/or by applying an adhesive substance to the caramelized pretzel dough surface have heretofore led to distortion of the taste, texture and/or appearance of the final product, and undesirable quantitative variances in salt retention.

Accordingly, an improved process for the manufacture of hard pretzels salted with flake-type salt which does not distort the taste, texture or appearance of the hard pretzels and which provides more effective salt retention would fulfill a long felt need in the industry and would represent a surprising and unexpected advancement in the art.

It is an object of the present invention to provide a method for producing hard pretzels in a continuous operation which enables the pretzels to retain flake-type salt without distorting taste, texture or appearance.

It is a further object of the present invention to provide a new and improved method for continuously producing hard pretzels salted with flake-type salt which negates the problem of quantitative variance and waste.

Other objects and advantages of the invention will become apparent to those skilled in the art from the following description.

SUMMARY OF THE INVENTION

The present invention provides a method for the continuous production of hard pretzels with improved retention of flake-type salt. The method employs a conventional dough composition and provides for precooking said composition in the conventional hot caustic bath but at lower caustic concentration and permits higher cook temperatures. The precooked and caramelized dough is then, however, passed through an atomized spray zone of the same hot caustic solution which unexpectedly provides an improved means for retaining salt and improved texture and appearance despite some washing off of the caramelized surface coating. Unexpectedly, the shiny dark brown finish is even darker and shinier at the dough surface despite lower caustic concentration and a lower pH. The otherwise expected excessive softening and undue moisture accumulation, does not occur. Quantitative variance and waste of salt is dramatically retarded.

An essential feature of the method of the invention is the continuous recycling of hot caustic solution from a caustic bath to the spray zone, which creates a closed reaction medium, at equilibrium, for precooking, caramelization and surface conditioning in the manufacture of hard pretzels.

DETAILED DESCRIPTION AND THE PREFERRED EMBODIMENTS

In accordance with the practice of this invention, a conventional pretzel dough is formulated and extruded onto a conveyer screen. The dough formula is not novel. With pretzel dough the formulation would typically include, by weight or other convenient measurements, flour, shortening, water, yeast, malt, and salt. Corn syrup may also be employed either with or without the malt. Typical formulations for use in the continuous production of pretzel doughs are presented in Tables I and II below:

TABLE I

|  | Twist (lbs) | Stick (lbs) |
|---|---|---|
| Flour | 100 | 100 |
| Shortening | 1-5 | 2.5-5.0 |
| Malt | 1-5 | 2.5-5.0 |
| Yeast | ½-1 | ½-1 |
| Water | 35-55 | 35-55 |
| Salt | 0-½ | 0-½ |
| Optional |  |  |
| Ammonium bicarbonate | ½ oz | 2.5 oz. |
| Sodium bicarbonate | 1.8 oz. | — |
| Yeast food | As Required |  |

TABLE II

|  | (lbs.) |
|---|---|
| Flour | 100 |
| Shortening, vegetable | 2-3 |
| Corn syrup | 3-4 |
| Yeast, compressed | 0.5 |
| Water | Variable |

The dough formula fed into the extruder also contains salt. Salt contributes to the characteristic flavor of the pretzel and helps to develop dough elasticity. Salt may be present in the mixture in an amount of up to 1.5%, and when desired preferably from 0.6% to 1.2% by weight.

Other additives which are conventionally present in pretzel dough formulations or which assist in extrusion can also be present in their usual effective amounts. Advantageously, a monoglyceride is present in the feed mixture in an amount from about 1.0% to 2.5%. Monoglycerides are monosubstituted fatty acid esters of glycerol in which the fatty acid moiety can be partially or completely saturated. They are usually employed in the food industry in the form of a steam-distilled fraction of vegetable oil containing at least 90% monoglyceride molecules. Monoglycerides which can be employed include, for example, Panalite 90 D (Panipuls, Inc., Olathe, Kans.). The monoglycerides act as a dough softener, if present in appropriate amounts. The monoglycerides can also act as extrusion aids to impart a smooth surface to the extrudate and ultimately to the finished product. Without such an extrusion aid, the extrudate tends to have a rough surface which is not consistent with the consumer's perception of a pretzel surface. It has also been found that the use of non-stick die surfaces such as Teflon ® die surfaces, enhances product surface smoothness. These can be provided either by coating the die surfaces with Teflon ® or by milling the die form a Teflon ® block.

The feed mixture may also incorporate, as an extrusion aid, an oil or a fat. The fats or oils which can be used can be derived from animal or vegetable sources, with vegetable oils generally being preferred. The fat or oil, if present, is generally present in the feed mixture in an amount from about 1.0% to 4.0% thereof. If desired, the fat or oil, in a liquid state, can be metered into the extruder separately from the other feed mixture ingredients. In addition to acting as an extrusion aid, the fat or oil tends to prevent swelling, shape deformation, or bubble formation in the product during baking.

Other ingredients which optionally can be present in the feed mixture include, for example, conventional pretzel flavoring agents. Foremost among these are malt and yeast. Malt, in the form of liquid malt, is generally present in an amount from about 1.5% to 2.5% of the feed mixture. Alternatively, dry powdered malt can be used in an amount from about 1.0% to 2.0% of the feed mixture. Yeast, in the form of dry baker's yeast, is generally present in an amount from about 0.5% to 2.5% of the feed mixture.

The dough extrudate is conveyed on a moving screen through a hot caustic cooker tank. The cooker contains a caustic solution of from about 1.0% to about 1.5% sodium hydroxide, preferably 1.3%, and is maintained at from about 195° F. to about 200° F. One advantage of the present invention is that the process permits this slightly higher precooking temperature as compared to the 190° F. maximum precooking temperature in the prior art. And, thus, leads to a darker, shinier finish for the final pretzels and crispier texture. Heretofore, in order to achieve this degree of pleasingly darker finish, shinier appearance and crispier texture, it would have been necessary to have a more concentrated caustic solution in which to pre-bake the pretzel dough extrudate. Such higher caustic concentrations, however, were deleterious to the taste of the hard pretzels.

After emerging from the precooking tank, the pretzels almost instantly form a hard, caramelized surface coating somewhat deeper than the normal caramelized coating for hard pretzels. These precooked and surface caramelized pretzels are then conveyed on the screen conveyer through an atomized spray zone of recycled caustic solution from the cooker. A plurality of atomization nozzles spray the hot caustic so as to homogeneously coat the outer surface of the caramelized pretzel dough extrudates. The atomization spray is provided at an effective rate of from 0.40 to 0.60 gal./minute provided that the conveyer screen moves product across the atomization spray in from 0.3 sec to 0.5 sec. This sufficiently softens the caramelization at the surface without unduly washing off said caramelization. Furthermore, the spray zone having emanated from recycled caustic of the precooking tank affords a closed reaction medium at equilibrium and therefore permits the unexpected advantages hereinbefore described.

After leaving the spray zone, the sprayed pretzel dough extrudates are conveyed through a conventional salting station where flake-type salt is distributed onto the pretzels as, for example, by a vibrating pan or other conventional seasoning distribution equipment. Suprisingly, only 6% to 8% salt by weight of the pretzel dough is required for salting at the salting station in order to achieve the 3% by weight flake-salt in the package.

Finally, the salted pretzels are conveyed into the baking oven where the conventional oven temperature of from 450° F. to 550° F. and a conventional residence time in the oven may be employed to cook the final pretzels. There is a noticeably deeper surface browning, shinier surface coating, improved salt retention, crispier taste, and a pH of only 8.4 to 8.5 as compared to a normal pH for hard pretzels of 9.0 to 9.2

The following example is intended to illustrate further the practice of the invention and is not intended to limit its scope in any way. All percentages previously given and any which follow are by weight unless otherwise specified.

EXAMPLE 1

The following ingredients were dry-blended:

| Ingredients | Parts by Weight per 100 parts |
|---|---|
| Pretzel flour | 6 |
| Salt | 0 |
| Corn syrup solids | 2.5 |
| Malt | 0.25 |
| Yeast | 0.25 |

The dry-blended ingredients were fed to a feed port of a screw extruder, and water was injected through the injection port at a rate of 250 pounds per hour. The temperature in the extruder barrel just prior to discharge achieved a steady state at approximately 100° F. The material exiting the extruder had a moisture content of 37%. Several samples were produced under varying caustic concentration and temperature conditions, varying spray conditions, varying salt conditions and the final results are reported in the table, including taste, texture, appearance and salt-retention information. Each sample utilized flake-type salt. The conditions and results are reported below in Table III.

TABLE III

| Samples | Caustic Concentration (Weight %) | Caustic Temperature of the bath | Spray Conditions | Rate of Salt Application (% by weight of the pretzel) | Results |
|---|---|---|---|---|---|
| A | 1.8 to 2.0 | 190° F. | None | 17.5 | 3% salt in the package but the remainder of the salt was wasted, dark brown, shiny finish, considerable loose salt in the package, pH 9 to 9.2. |
| B | 1.8 to 2.0 | 195° F. | None | 17.5 | Less than 2% salt in the package, otherwise the same as Sample A. |
| C | 1.1 to 1.3 | 190° F. | None | 17.5 | Same as Sample A except lighter brown in color and not as hard or as crunchy, more cracker-like taste, pH 8.4 to 8.5. |
| D | 1.1 to 1.3 | 195° F. | None | 17.5 | Same as Sample B but lighter brown in color, softer and more cracker-like taste, pH 8.4 to 8.5. |
| E | 3.0 | 190° F. | None | 17.5 | Only 3% salt retained in package, but more pleasingly dark color |

TABLE III-continued

| Samples | Caustic Concen-tration (Weight %) | Caustic Tempera-ture of the bath | Spray Condi-tions | Rate of Salt Application (% by weight of the pretzel) | Results |
|---|---|---|---|---|---|
| F | .35 | (no bath) | 180° F. | 7.5 | and harder, crispier mouth feel but severe bitter alkaline off taste, 10.5 to 11 pH. 3% salt retained in the package with less salt needed for application. However, soft pretzels were produced with cracker-like taste and no precooking nor caramelized coating was achieved. |
| G | 1.1 | 190° F. and 195° F. | 190° F. and 195° F. spray by non atomized | 7.5 | 3% salt retention in the bag but caramelization washed off and unduly lighter brown color, softer than desirable for hard pretzels and more cracker-like taste than desired. |
| H | 1.1 | 195° F. | 195° F. atomized spray | 7.5 | 3% salt retained in package, surprisingly harder pretzels and crispier than prior art which implied higher caustic concentrations even at the same cook temperature; darker brown more pleasing pretzel appearance and shinier than higher caustic concentrations even at the same temperature; less salt required for the targeted retention despite harder texture, and caramelization retained; and hard pretzel taste despite use of spray. |

As indicated by the above table, the process of the invention which is the last sample, "H", surprisingly affords the ability to obtain darker, shinier harder pretzels, previously only possible at such severe caustic concentrations that alkaline off taste was developed. Additionally, lower caustic concentrations are permitted and higher precooking temperatures for harder, shinier pretzels than was possible in the prior art without an atomized spray. Additionally, atomization of the spray unlike prior art non-atomized spray permitted sufficient caramelized coating to be retained while surprisingly permitting effective flake salt retention.

What is claimed is:

1. A method for making hard pretzels comprising:
   a. sufficiently immersion cooking pretzel dough in caustic solution to form a caramelized surface layer;
   b. transporting the cooked and caramelized dough through a spray zone of the caustic solution wherein said cooked and caramelized dough is homogeneously coated on its outer surface with said caustic solution;
   c. sprinkling flaked salt over the cooked and coated dough; and
   d. hard-baking the cooked and coated dough into the hard pretzels;
   said coating step being sufficient to improve retention of flaked salt and darker coloring at lower pH in the hard pretzels than if step (b) had been omitted.

2. The method of claim 1 wherein the caustic solution is maintained at 195° F. to 200° F.

3. The method of claim 1 wherein the caustic solution contains from about 1% to 1.5% by weight sodium hydroxide.

4. The method of claim 1 wherein the salt is sprinkled in an amount of 6% to 8% by weight of the pretzels.

5. The method of claim 1 wherein the hard-baked pretzels are at a pH of 8.4 to 8.5.

6. An improved method for making hard pretzels from immersion cooked dough, salted with flaked salt comprising:
   spraying surface-caramelized immersion cooked dough with an effective amount of caustic cooking solution prior to application of said salt;
   applying said salt onto said sprayed and immersion cooked dough;
   and hard-baking the salted and immersion cooked dough while retaining improved weight percent flaked salt and darker coloring at lower pH for the hard pretzels.

7. The method of claim 6 wherein the caustic solution contains from about 1% to about 1.5% caustic by weight, at 195° F. to 200° F., and the flaked salt is applied in an amount of from about 6% to 8% by weight of the pretzels while 3% by weight of said pretzels is retained in the final product.

* * * * *